(12) United States Patent
Richardson et al.

(10) Patent No.: US 12,555,092 B2
(45) Date of Patent: Feb. 17, 2026

(54) IOT DEVICES

(71) Applicant: MASTERCARD INTERNATIONAL INCORPORATED, Purchase, NY (US)

(72) Inventors: Gary Richardson, Anmore (CA); Colum Duffy, Richmond (GB); Husham Hamdan, Croydon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 224 days.

(21) Appl. No.: 18/009,276

(22) PCT Filed: May 13, 2021

(86) PCT No.: PCT/US2021/032240
§ 371 (c)(1),
(2) Date: Dec. 8, 2022

(87) PCT Pub. No.: WO2021/252125
PCT Pub. Date: Dec. 16, 2021

(65) Prior Publication Data
US 2023/0222480 A1    Jul. 13, 2023

(30) Foreign Application Priority Data

Jun. 10, 2020  (EP) .................................. 20179378

(51) Int. Cl.
*G06Q 20/30* (2012.01)
*G06Q 20/36* (2012.01)
*G06Q 20/40* (2012.01)

(52) U.S. Cl.
CPC ....... *G06Q 20/308* (2020.05); *G06Q 20/3674* (2013.01); *G06Q 20/401* (2013.01); *G06Q 20/4093* (2013.01)

(58) Field of Classification Search
CPC ............ G06Q 20/308; G06Q 20/3674; G06Q 20/401; G06Q 20/4093
See application file for complete search history.

(56) References Cited

U.S. PATENT DOCUMENTS 9,614,815 B2    4/2017  Grange et al.
10,455,029 B2 *  10/2019  Jablonski ................ G06F 40/58
(Continued)

FOREIGN PATENT DOCUMENTS

| EP | 3007408 A2 | 4/2016 |
| WO | WO2016/075530 | 5/2016 |
| WO | WO2018/147988 | 8/2018 |

OTHER PUBLICATIONS

S. Khanji, F. Iqbal, Z. Maamar and H. Hacid, "Boosting IoT Efficiency and Security through Blockchain: Blockchain-based Car Insurance Process—A Case Study," 2019 4th International Conference on System Reliability and Safety(ICSRS), Rome, Italy, 2019, pp. 86-93, doi: 10.1109/ICSRS48664.2019.8987641. (Year: 2019).*

(Continued)

*Primary Examiner* — David P Sharvin
*Assistant Examiner* — Steven R Chism
(74) *Attorney, Agent, or Firm* — Harness, Dickey & Pierce, P.L.C.

(57) ABSTRACT

A method of operating an Internet of Things (IoT) device, the IoT device capable of communicating with a third-party system in order to perform an autonomous task subject to authorisation by an IoT authorisation device, the method comprising: sending operating parameters relating to the autonomous task to a user for approval; receiving user-approved operating parameters for the autonomous task; configuring the IoT device to perform the autonomous task within the user approved operating parameters; registering the user approved operating parameters with the IoT device management server to enable the IoT authorisation device to (Continued)

check that the IoT device is operating within the user-approved operating parameters when it performs an autonomous task with the third-party system.

9 Claims, 4 Drawing Sheets

(56) References Cited

U.S. PATENT DOCUMENTS

| | | | |
|---|---|---|---|
| 10,686,626 B2* | 6/2020 | Sarwar | H04L 41/0886 |
| 10,715,599 B2* | 7/2020 | Hao | H04W 4/70 |
| 10,917,706 B2* | 2/2021 | Damaggio | H04L 41/0806 |
| 11,004,132 B2* | 5/2021 | Ali | G06Q 20/102 |
| 11,354,636 B2* | 6/2022 | Wang | G06Q 20/40 |
| 2014/0214516 A1 | 7/2014 | Genschel et al. | |
| 2018/0232734 A1* | 8/2018 | Smets | G06Q 20/40 |
| 2018/0260867 A1 | 9/2018 | Lin et al. | |
| 2018/0330248 A1 | 11/2018 | Uhr et al. | |
| 2019/0026716 A1 | 1/2019 | Anbukkarasu et al. | |
| 2019/0057380 A1* | 2/2019 | Florinis | G06Q 20/405 |
| 2019/0057385 A1 | 2/2019 | Nair et al. | |

OTHER PUBLICATIONS

Hang, L., & Kim, D.-H. (2019). Design and Implementation of an Integrated IoT Blockchain Platform for Sensing Data Integrity. Sensors, 19(10), 2228. https://doi.org/10.3390/s19102228 (Year: 2019).*

* cited by examiner

IOT DEVICES

CROSS-REFERENCE TO RELATED APPLICATIONS

This application is a U.S. national stage filing under 35 U.S.C. § 371 of International Application No. PCT/2021/032240, filed on May 13, 2021, which claims the benefit of, and priority to, European Patent Application No. 20179378.3, filed on Jun. 10, 2020. The entire disclosure of each of the above applications is incorporated herein by reference for all purposes.

TECHNICAL FIELD

The present disclosure relates to Internet of Things (IoT) devices. In particular, the disclosure relates to provisioning IoT devices such that they can autonomously perform transactions. The disclosure relates to a method of performing transactions using an IoT device, an IoT device for performing transactions, a method of performing transactions on a server and a server for performing transactions.

BACKGROUND

The Internet of Things (IoT) is defined as a network of objects or "things" embedded with electronics, software, sensors and network connectivity which enables these objects to collect and exchange data. There is perceived to be a huge market opportunity for IoT devices which could be worth trillions of dollars.

IoT devices can be classified into two general categories:
Non-payment capable devices e.g. devices performing monitoring, tracking etc.
Transaction capable devices e.g. wearables, home appliances, connected cars, etc.

Most IoT devices deployed today are non-transaction capable devices with only some wearables supporting transactions. IoT devices supporting transactions can be divided into two categories:
Devices that perform transactions as a result of cardholder action/request
Devices that perform transactions autonomously as a result of an event occurring e.g. fridge ordering food/drink, printer ordering ink or spare part, car paying at a toll etc.

Payment cards such as credit cards and debit cards are very widely used for all forms of financial transaction. A typical payment card now contains an integrated circuit (making it a "chip card" or "smart card") which can be read by a smart card reader in a merchant POS (point of sale) terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type. Contactless payments are now possible between suitably enabled payment cards and merchant terminals by short range wireless technology using NFC protocols—under EMV, these are covered under the ISO/IEC 14443 standard. Payment cards and devices are provided under a transaction scheme (such as Mastercard, American Express or Visa) and the transaction mechanism is mediated by the transaction scheme infrastructure. EMV specifications that relate to contact and contactless payment protocols are publicly available at the EMVCo website (EMVCo is the industry body tasked with maintaining these specifications with the support of major transaction scheme providers)—https://www.emvco.com/document-search/—and would readily be consulted by the person skilled in the art. Terminology relating to EMV technology not expressly defined in this document is referenced and defined in EMV specifications, as will be appreciated by the person skilled in the art.

Increasingly, transactions are made in a digital domain ("ecommerce" transactions). Contactless payments may for example be performed by a mobile phone running a mobile payment application and communicating with a POS terminal using the same protocols as a contactless card. The term "payment device" is now a generic term to describe a device that can perform contactless transactions with a terminal. A payment device may be a traditional payment card or a device (e.g. a smartphone or a smartwatch) that has been provisioned with a digital wallet that contains one or more digitised payment cards. It is increasingly common, however, to transact with payment devices online, for example at a merchant website. Transactions will then be fed into the transaction scheme by a payment service provider providing an internet gateway to the merchant.

Online transactions have generally been treated as "Cardholder Not Present" (CNP) transactions (other examples would be credit card payments made by telephone), which create security issues as a full EMV protocol contact or contactless interaction may not be available and there is no proximity between payment device and POS terminal to provide an additional measure of security. A normal approach to providing additional customer verification is to provide a card verification code printed on the card. Additional technologies have also been developed to improve security and efficiency of transactions carried out in the digital domain—particularly relevant are tokenisation via a mobile wallet and the use of stored card details.

IoT devices may be provisioned to perform Cardholder-Not-Present transactions on-behalf the cardholder (known as autonomous IoT devices). However, such devices may be vulnerable to fraud attacks or performing transactions that should not be performed.

The present disclosure aims to provide transaction enabled Internet of Things devices with improved security and performance capabilities.

SUMMARY OF THE DISCLOSURE

According to a first aspect of the present disclosure there is provided a method of operating an Internet of Things (IoT) device, the IoT device capable of communicating with a third-party system in order to perform an autonomous task subject to authorisation by an IoT authorisation device, the method comprising: sending operating parameters relating to the autonomous task to a user for approval; receiving user-approved operating parameters for the autonomous task; configuring the MT device to perform the autonomous task within the user approved operating parameters; registering the user approved operating parameters with the IoT authorisation device to enable the IoT authorisation device to check that the IoT device is operating within the user-approved operating parameters when it performs an autonomous task with the third-party system.

IoT devices that are capable of undertaking autonomous tasks with third party entities require appropriate configuration so that they do not undertake tasks that should not be performed. The present disclosure provides a method of operating an Internet of things (IoT) device in which operating parameters relating to the autonomous task (or tasks) that the IoT device can undertake are sent to a user (via a user device) for approval. The user may accept, modify or reject (and propose their own operating parameters) the operating parameters that they are presented with and return a set of user-approved operating parameters to the IoT device. The user-approved operating parameters are then registered with an IoT authorisation device such that they can be checked to determine if the IoT device is operating correctly whenever it performs an autonomous task with a third party.

The present disclosure enables a user to presented with an appropriate set of operating parameters to select from (which avoids or mitigates the possibility that the user sets unrealistic operating parameters) and enables future interactions between the IoT device and third parties to be authorised by the IoT authorisation system.

The IoT device may be associated with a digital wallet containing a tokenised payment card and the autonomous task may comprises performing a transaction with the third-party system (e.g. a transaction with a merchant). The digital wallet may be stored on IoT device. Alternatively, the digital wallet may be stored on an IoT relay device that mediates communications between the IoT device, the user, IoT authorisation device. The IoT relay device may be, for example, an Internet of Things hub located in an environment which monitors the actions of one or more IoT devices located in the environment. As an alternative, the IoT relay device may be an application running on a user device. The operating parameters may be a transaction amount limit with a merchant.

The sending of operating parameters may comprise sending a plurality of operating parameters to the user for approval and receiving user-approved operating parameters comprises receiving a user selection of one or some of the plurality of operating parameters. The operating parameters that are sent to the user may be predetermined (e.g. operating parameters may be specified by an original equipment manufacturer and stored to the IoT device for sending to the user during a registration process). The operating parameters may however be varied, as noted below based on environmental or usage data.

Configuring the IoT device may comprises restricting the IoT device to communicate with specified third-party systems according to the user-approved operating parameters. For example, if the autonomous task comprises the IoT device ordering consumables via a third party (merchant) then the IoT device may be configured to only perform transactions with a specified set (or singular) merchant(s).

Configuring the IoT device may comprise restricting the IoT device to carry out specified autonomous tasks according to the user-approved operating parameters. It is noted that the user may modify the operating parameters they receive and may send the modified operating parameters as the user-approved parameters. For example, the IoT device may propose a financial limit for autonomous transactions it wishes to undertake and the user may vary the financial limit.

Prior to sending the operating parameters to the user, environment data relating to the environment that the IoT device will operate in may be requested and the operating parameters to be sent to the user for approval may be determined based on the received environment data. For example, where the IoT device is to be placed into a home environment the number of users of the IoT device may be requested and the operating parameters sent to the user may be based on the number of users.

Prior to sending the operating parameters to the user, a request for usage data may be sent to the user and the operating parameters to send to the user for approval may be determined based on the received usage data. For example, a survey may be initiated with the user during a registration process in order to determine usage data.

The method of the present disclosure may comprise initiating the autonomous task with the third party system, the autonomous task comprising sending a communication to the third party system via the IoT authorisation device. The communication sent to the third party via the IoT authorisation device may comprise an IoT device identifier and a request to the IoT authorisation device for authorisation to carry out the autonomous task.

The authorisation device may be the IoT relay device discussed above or a cloud based server, an IoT device management server.

The IoT device may send the operating parameters to the user and according to a second aspect of the present disclosure there is provided a method of operating an Internet of Things (IoT) device, the IoT device capable of communicating with a third-party system in order to perform an autonomous task subject to authorisation by an IoT authorisation device, the method comprising: sending, from the IoT device, operating parameters relating to the autonomous task to a user for approval; receiving, at the IoT device, user-approved operating parameters for the autonomous task; configuring the IoT device to perform the autonomous task according to the user approved operating parameters.

The preferred features relating to the first aspect of the disclosure apply to the second aspect of the disclosure.

Communications with the third party system may be made via the IoT authorisation device (e.g. an IoT relay device or an IoT device management server). An IoT device identifier may be sent to the IoT authorisation device when initiating communications with the third-party system. This enables the IoT authorisation device to look up the details of the IoT device in a profile and recall the user-approved operating parameters.

According to a third aspect of the present disclosure, there is provided a method of operating an IoT relay device to manage interactions with an Internet of Things (IoT) device, the IoT device capable of communicating with a third-party system in order to perform an autonomous task subject to authorisation by an IoT device management server, the method comprising: receiving, at an IoT relay device, operating parameters relating to the autonomous task; sending, from the IoT relay device to a user, the received operating parameters for user approval of the operating parameters; receiving, at the IoT relay device, user-approved operating parameters for the autonomous task; sending, from the IoT relay device, the user-approved operating parameters to the IoT device to allow the IoT device to configure itself such that autonomous tasks can be performed in accordance with the user-approved operating parameters.

The user-approved operating parameters may also be sent to an IoT authorisation device. Other preferred features relating to the first aspect of the disclosure apply to the third aspect of the disclosure.

According to a fourth aspect of the present disclosure there is provided a method of operating an IoT authorisation device, the IoT authorisation device configured to manage interactions between an Internet of Things (IoT) device and a third-party system, the IoT device capable of communicating with the third-party system in order to perform an autonomous task, the method comprising: receiving a request from the IoT device to perform an autonomous task with the third-party system, the request comprising: an IoT device identifier, parameter data related to the autonomous task; looking up user-approved operating parameters for the IoT device using the IoT device identifier contained in the request; comparing the parameter data contained in the request against the stored user-approved operating parameters for the IoT device; authorising the request to perform the autonomous task in the event that the parameter data conforms to the stored user-approved operating parameters.

The IoT authorisation device may be an IoT device management server. Such a server may be cloud based and may comprise a wallet processing module that can provision the IoT device with a digital wallet. The server may also hold the digital wallet and pass payment credentials to a third party on-behalf of the IoT device once an IoT device request is approved. The server may further comprise a data store comprising a number of profiles for different IoT devices, each profile storing the user-approved operating parameters for a given IoT device.

Prior to receiving the request from the IoT device, the server may be arranged to receive and store user-approved operating parameters for the IoT device and an associated IoT device identifier.

The method may comprise establishing a communications path between the IoT device and the third-party system. in the event that the received parameter data does not conform to the stored user-approved operating parameters, the IoT authorisation device may notify a user or an IoT relay device and request approval for the task.

In the event that the received parameter data does not conform to the stored user-approved operating parameters, the IoT authorisation device may send a command signal to the IoT device to disable the IoT device.

According to a further aspect of the present disclosure there is provided an Internet of Things (IoT) device for communicating with a third-party system in order to perform an autonomous task subject to authorisation by an IoT authorisation device, the device comprising: an output arranged to send operating parameters relating to the autonomous task to a user for approval; an input arranged to receive user-approved operating parameters for the autonomous task; a processor arranged to configure the IoT device to perform the autonomous task within the user approved operating parameters and to register the user approved operating parameters with the IoT authorisation device to enable the IoT authorisation device to check that the IoT device is operating within the user-approved operating parameters when it performs an autonomous task with the third-party system.

According to a further aspect of the present disclosure there is provided an IoT authorisation device configured to manage interactions between an Internet of Things (IoT) device and a third-party system, the IoT device capable of communicating with the third-party system in order to perform an autonomous task, the IoT authorisation device comprising: an input arranged to receive a request from the IoT device to perform an autonomous task with the third-party system, the request comprising: an IoT device identifier, parameter data related to the autonomous task; a processor arranged to look up user-approved operating parameters for the IoT device using the IoT device identifier contained in the request and to compare the parameter data contained in the request against the stored user-approved operating parameters for the IoT device and to authorise the request to perform the autonomous task in the event that the parameter data conforms to the stored user-approved operating parameters.

The processor being arranged to set up a communications link with the third party via an output of the IoT authorisation device.

The present disclosure extends to a computer program comprising instructions which, when the program is executed by an Internet of Things device, cause the IoT device to carry out the method of the first or second aspects of the disclosure.

The present disclosure extends to a computer program comprising instructions which, when the program is executed by an Internet of Things relay device, cause the IoT relay device to carry out the method of the third aspect of the disclosure.

The present disclosure extends to a computer program comprising instructions which, when the program is executed by a server, cause the server to carry out a method according to the fourth aspect of the disclosure.

A computer-readable storage medium comprising instructions which, when executed by an Internet of Things (IoT) device, cause the IoT device to carry out the method of the first or second aspects of the disclosure.

A computer-readable storage medium comprising instructions which, when executed by an Internet of Things (IoT) relay device, cause the IoT relay device to carry out the method of the third aspect of the disclosure.

A computer-readable storage medium comprising instructions which, when executed by a server, cause the server to carry out the method of fourth aspect of the disclosure.

BRIEF DESCRIPTION OF THE DRAWINGS

One or more embodiments of the disclosure will now be described, by way of example only, with reference to the accompanying drawings, in which.

DETAILED DESCRIPTION

General and specific embodiments of the disclosure will be described below with reference to the Figures.

The "Internet of Things" (IoT) generally refers to the concept of connecting devices to the Internet and each other. Potentially any device may be made Internet capable and in the context of the present application IoT device may include, without limitation, mobile phone devices, wearable devices (such as smartwatches), TVs, washing machines, printers, fridges, vehicles, smart glasses, headphones etc.

The systems and methods described herein allow IoT devices to perform autonomous transactions. An IoT server (or "backend" server) facilitates provisioning of IoT devices with a payment application 103 (a "digital wallet"), provisioning one or more payment cards into the payment application and performing transactions between a merchant (or a merchant server) and an IoT device.

Overview

Figure 1:
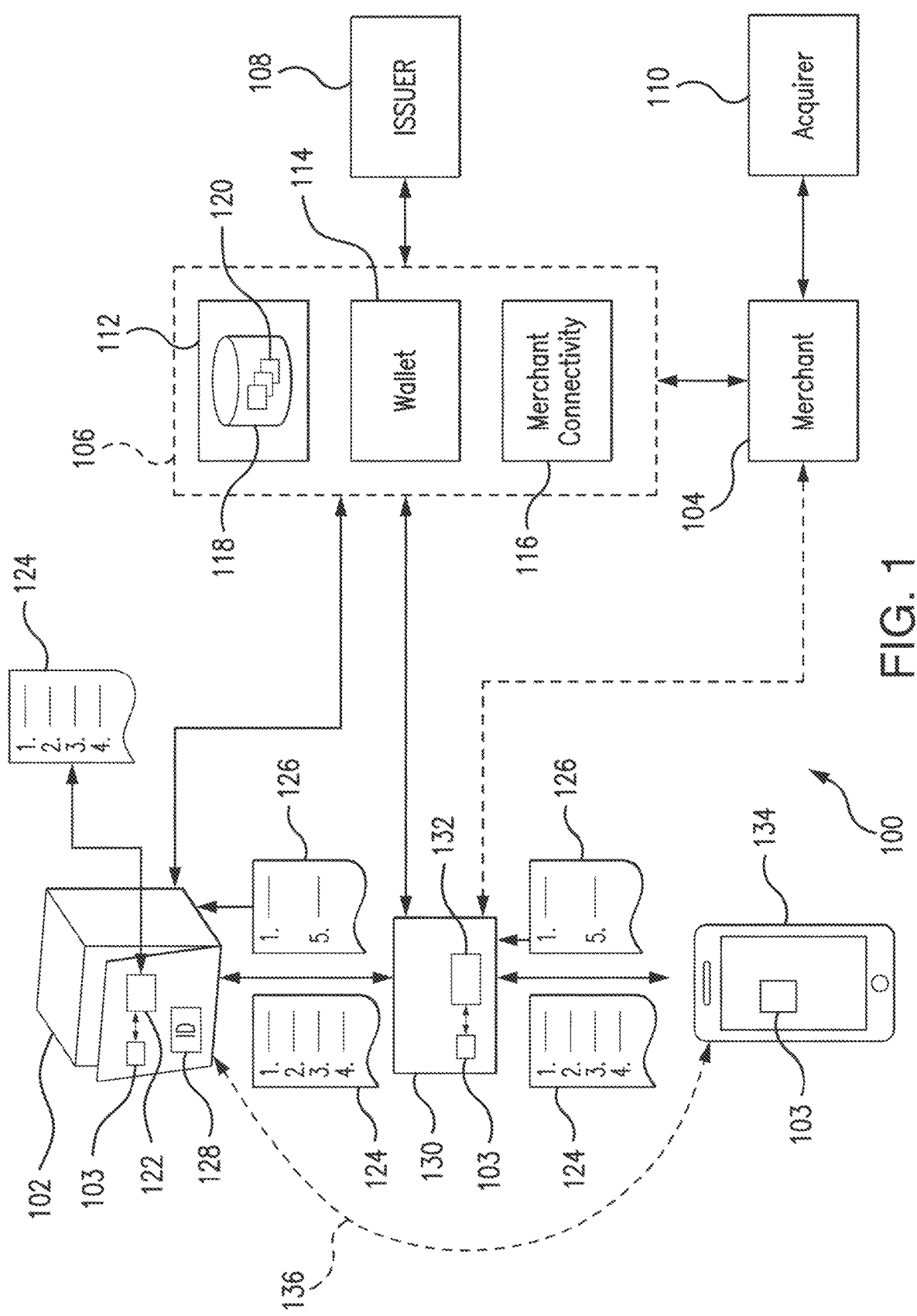
FIG. 1 shows schematically an overview of a transaction system in accordance with an embodiment of the present disclosure.

FIG. 1 illustrates an exemplary system 100 in which one or more aspects of the present disclosure are described. The system 100 includes an IoT device 102 (in FIG. 1 an Internet enabled dishwasher is shown but it is to be appreciated that this could be any IoT device) comprising a payment application 103, a merchant 104 (or merchant server), an IoT server 106 (which as described below may be used to provision a digital wallet/payment application on the IoT device and to handle any tokenization/detokenization processes and to perform security checks on transactions initiated by the IoT device 102), and an issuer entity 108 associated with a cardholder (not shown) who has provisioned (via the IoT server 106 or otherwise) one or more payment cards to the IoT device 102 (such that the digital wallet comprises a digitised payment card). An acquirer entity 110 that is associated with the merchant 104 is also shown in FIG. 1.

The IoT server 106 comprises an IoT device management processor 112, a wallet processor 114 which is arranged to provision a cardholder's payment card into a payment application 103 within the IoT device 102 (the wallet processor may also be referred to herein as a token service provider) and a merchant connectivity processor 116. The token service provider may also tokenise payment card data and issue tokens to the IoT device 102. The tokens may take the form of a token PAN (primary account number), or a token PAN and a token expiry date.

It is noted that three separate processing units/processors are shown within the IoT server 106 but the functionality provided by the three units may be provided by a single processing platform.

The IoT device management processor 112 comprises a data store 118, e.g. in the form of a database, within which a plurality of profiles 120 are stored.

The IoT device 102 comprises a processor 122 which is in communication with the payment application 103. The processor 122, as described below, is arranged to set operating parameters for the IoT device 102. Setting the operating parameters may comprise issuing a number of operating parameters 124 to a user/owner of the IoT device 102 and receiving user-approved operating parameters 126 in return. The user-approved operating parameters 126 may comprise some or all of the operating parameters 124 that were issued by the IoT device 102. The user-approved operating parameters 126 may also comprise user specified parameters.

The IoT device 102 comprises an IoT device identifier 128 that may be used by, for example the IoT server 106, to identify the IoT device 102 in order to determine whether to authorise a transaction to be made by the MT device 102.

The system 100 further comprises a relay device 130 comprising a processor 132. The relay device 130 may take the form, for example, of an Internet of Things hub which is located at a location, e.g. a user's home, and which is configured to manager the operation of one of more IoT devices 102. The system 100 further comprises a user device 134.

As shown in FIG. 1, the relay device 130 and user device 134 may comprise a payment application 103 of their own. The relay device 130 may forward operating parameters 124 suggested by the IoT device 102 to the user device 134 for approval and may additionally forward user-approved operating parameters 126 from the user device 134 to the IoT device 102. It is noted that the relay device 130 shown in FIG. 1 is shown as a physical device but in alternative configurations may be configured as an application ("app") on the user device 134.

The operation of the IoT device 102, relay device 130, user device 134 and IoT server 106 are described below.

The IoT device 102, merchant 104, IoT server 106, issuer 108, acquirer 110, relay device 130 and user device 134 are each coupled to and in communication with one or more networks which are represented by the dotted and solid arrows in FIG. 1. The networks may comprise any of the following: wired or wireless networks, a local area network, a wide area network, a mobile communications network, the Internet.

In the system 100, the IoT server 106 and relay device 130 may, depending on the particular configuration of the system 100, be configured to authorise tasks that the IoT device 102 may autonomously undertake in dependence on the user-approved operating parameters that have been set. As such the relay device 130 and/or IoT server 106 may operate as an IoT authorisation apparatus.

Methods of use of the system of FIG. 1 are shown in FIGS. 2 to 5 and described below.

Figure 2:
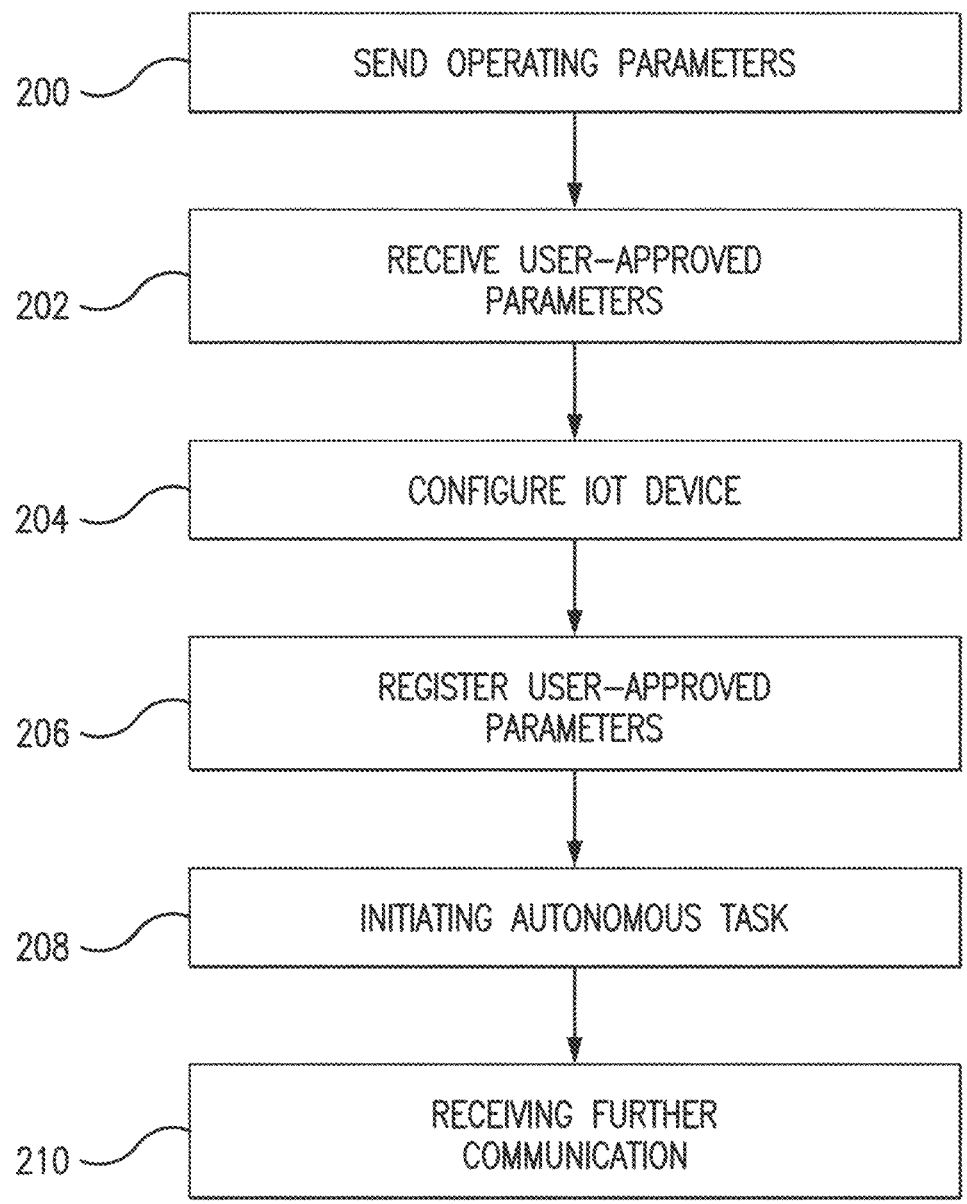
FIG. 2 is a flow chart of method of operation of the system of FIG. 1.

FIG. 2 is a flow chart detailing an overall method of operating the IoT device 102 in accordance with an embodiment of the present disclosure. In FIG. 2 the process of configuring and setting the IoT device 102 up for operation within a particular environment is described.

It is noted that in FIG. 2, the IoT device 102 is considered to comprise a digital wallet that contains a tokenised payment card and that the IoT device 102 is being configured in order to allow it to carry out autonomous tasks with a third party (in this case the merchant 104). It is to be appreciated however that there are alternative configurations for the IoT device 102 to interact with the third party. For example, the relay device 130 may instead comprise the payment application 103 (as shown in FIG. 1) and the autonomous tasks that the IoT device 102 performs with the third party (merchant 104) may instead be routed through the relay device 130.

Returning to FIG. 2, in step 200, operating parameters 124 relating to an autonomous task that the IoT device 102 can perform are sent, by the processor 122, to the user device 134 in order to be approved. The operating parameters 124 for approval from the user are sent from the IoT device 102 to the user device 134 via the relay device 130. It is noted that in an alternative arrangement the operating parameters may be sent directly to the user device 134 (see arrow 136).

As described herein, the operating parameters may be sent from the IoT device 102 but in alternative configurations operating parameters may be supplied from another source, e.g. from the IoT server 106 or the relay device 130.

The operating parameters 124 that are sent for user approval may comprise predetermined parameters. For example, the operating parameters may relate to a transaction amount limit that the IoT device 102 cannot exceed when carrying out a transaction with the merchant 104. Such a transaction amount limit may be set by the manufacturer of the IoT device and stored within the IoT device 102 during manufacture such that it can be suggested to the user during the set up process.

The operating parameters may also comprise a selection of autonomous tasks that the IoT device 102 is authorised to undertake. For example, in the transaction example above, the operating parameters may comprise a list of products that the IoT device 102 may obtain from the merchant 104.

The operating parameters that are sent for approval may also comprise the particular merchants 104 that the IoT device 102 may transact with. For example, a list of all available merchants may be suggested by the IoT device 102 to the user. The operating parameters may alternatively be configured such that the user is locked to a particular merchant 104 for a given period.

In step 202, user-approved operating parameters 126 are received at the IoT device 102 from the user device 134. It is noted that the user-approved operating parameters 126 may comprise a selection of the operating parameters 124 that were sent in step 200. For example, the user may have selected to restrict the IoT device 102 to interacting with a specific merchant 104 and may have selected a specific subset of autonomous tasks that it can carry out.

In step 204 the IoT device 102 is configured to operate as per the user-approved parameters 126 received in step 202.

In step 206 the user-approved parameters are registered with an IoT authorisation device (e.g. the IoT server 106 or the IoT relay device 130). Registering the user-approved parameters may occur because the user-approved parameters 126 are routed through the MT authorisation device as they are sent to the IoT device 102. Alternatively, the IoT device 102 may be configured to register the user-approved parameters with the IoT authorisation device after the IoT device 102 has received the user-approved parameters.

Where the user-approved parameters 126 are registered with the IoT server 106 then they may be stored within the data store 118 in the profile 120 associated with the IoT device 102.

It is noted that, following the registration of the user-approved parameters 126 with the IoT authorisation device, when the IoT device 102 undertakes to perform an autonomous task with the third party such task will require the IoT authorisation device to authorise the task to take place (as described below in relation to FIG. 3).

Prior to sending the operating parameters 124 in step 200 above, the processor 122 within the IoT device 102 may request from the IoT relay device 130 usage data relating to the user and/or environmental data relating to the environment in which the IoT device 102 is situated. The operating parameters 124 that are then sent in step 200 may then be selected in dependence on the usage or environmental data. Such an initial "data gathering" step would allow the IoT device 102 to select operating parameters 124 that are most suitable for the environment in which it is placed and the likely usage it will undertake. In the example of the dishwasher above environmental data may comprise details of the number of individuals in the home in which the dishwasher is located. For a large household the IoT device may determine that it is likely to require more consumables (dishwasher powder, rinse aid etc) and consequently suggest higher limits (higher operating parameters) than for a smaller household. Similarly, the IoT relay device 130 may have access to relevant historical usage data (e.g. in the dishwasher example the relay device 130 may have records indicating how often the dishwasher is run and how often the consumables need replacing).

The IoT device 102 may additionally or alternatively conduct the initial "data gathering" step by directly contacting the user device 134 and requesting information from the user. For example, the set up process for the IoT device 102 may include sending a short survey to the user device 134 for completion by the user. The results of such survey could be used to determine the initial operating parameters 124 to be sent to the user.

In step 208, the IoT device 102 initiates an autonomous task in dependence on the user-approved parameters 126. Such an autonomous task comprises sending a communication to the third party via the IoT authorisation device (106, 130). In the dishwasher example described above the autonomous task may comprise ordering consumables and the communication may comprise sending an order (via the IoT authorisation device) to a merchant 104 that sells the consumables.

In step 210 the IoT device receives a further communication. This further communication may be an acknowledgement from the third party that the communication from the IoT device relating to the autonomous task has been carried out (for example, in the dishwasher example, the further communication could be a transaction receipt). If the further communication received by the IoT device 102 has originated from the third party then this means that the IoT authorisation device has checked and authorised the outgoing communication in step 208 as meeting the user-approved parameters 126 as stored in the data store 118.

In the event that the communication sent in step 208 did not conform to the user-approved parameters 126 then the further communication may be a command signal to shut the IoT device down. Alternatively, the further communication may be a notification signal to the user device 134. The further communication is discussed further in relation to FIG. 3 below.

Figure 3:
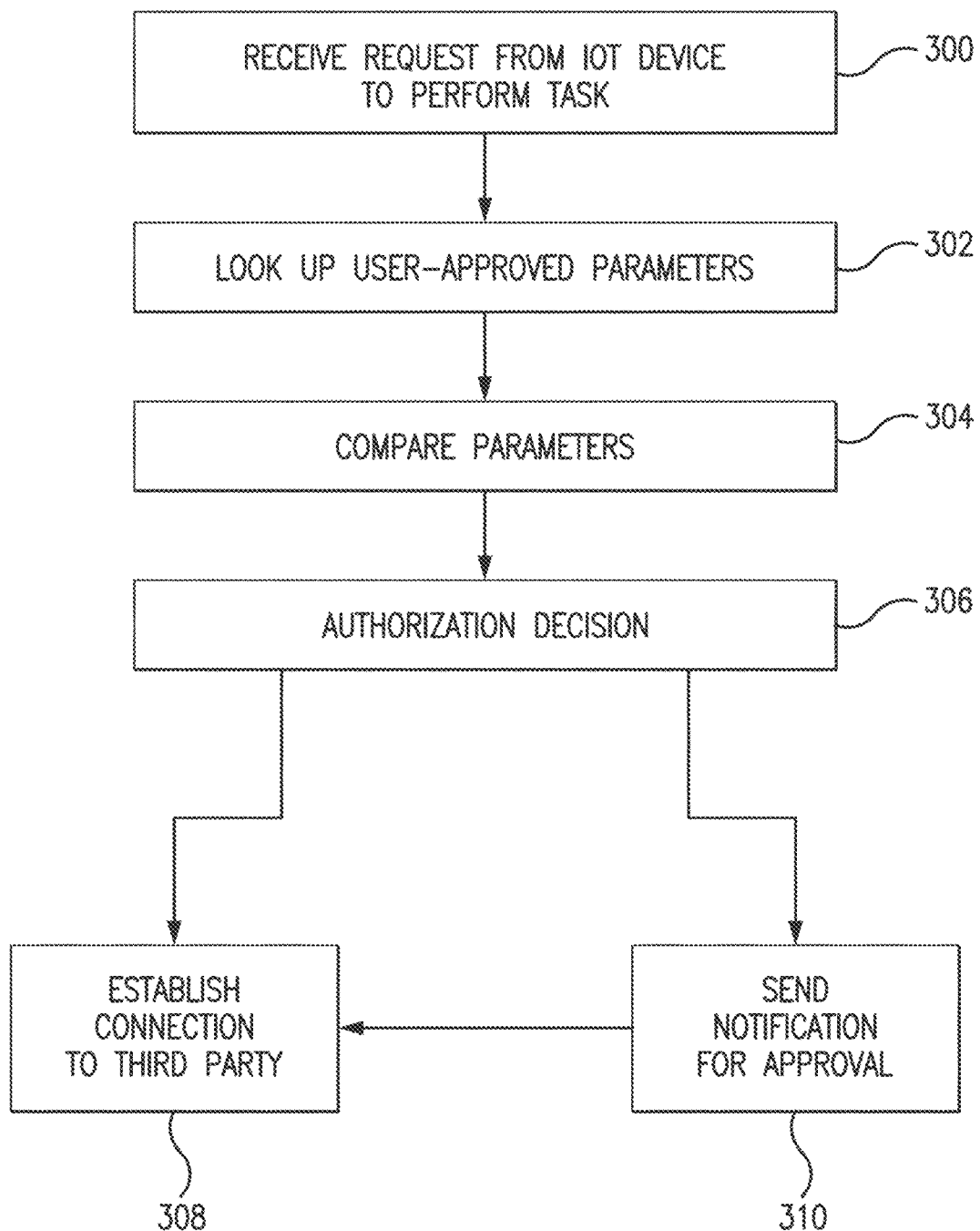
FIG. 3 is a flow chart of a method of operating an IoT authorisation device according to an embodiment of the present disclosure.

FIG. 3 shows a method of operating an IoT authorisation device in accordance with embodiments of the present disclosure. It is noted that in FIG. 1 either the IoT server 106 or the IoT relay device 130 may be configured to perform the steps below. In the context of the following description however the IoT authorisation device is taken to be the IoT server 106.

The IoT server 106 in its role as the IoT authorisation device is configured to receive and store the user-approved operating parameters 126 and to manage future interactions between the IoT device 102 and third parties (such as the merchant 104) when the IoT device 102 wants to undertake an autonomous task (e.g. in the dishwasher example, when the dishwasher places an order for consumables).

In step 300 the IoT server 106 receives a request from the IoT device 102 relating to an autonomous task that that the IoT device wishes to carry out. The request comprises the IoT device identifier 128 along with parameter data related to the autonomous task.

In step 302 the IoT device management processor 112 uses the IoT device identifier 128 to retrieve the IoT device profile 120 from the data store 118 and retrieves the user-approved operating parameters associated with that IoT device 102.

In step 304 the processor 112 compares the stored user-approved operating parameters against the parameter data contained in the request received from the IoT device.

In step 306 the IoT device management processor 112 makes an authorisation decision regarding the request received from the IoT device 102 and, in the event that parameter data in the request conforms to the stored user-approved operating parameters the IoT sever 106 will authorise the autonomous task requested by the IoT device 102.

In step 308, following a positive authorisation result in step 306, the merchant connectivity processor 116 within the IoT server 106 establishes a communications path between the IoT device 102 and the merchant 104 such that the autonomous task can be performed.

In the event that the IoT device management processor 112 makes a negative authorisation decision in step 306 (i.e. the parameter data in the request does not conform to the stored user-approved operating parameters) then the IoT server 106 may instruct the IoT device to shut down by sending a command signal. However, the IoT server 106 may, in step 310, send a notification signal to the user device 134 (either directly or via the IoT relay device 130) to request approval of the autonomous task requested by the IoT device 102. In the event that the IoT server 106 then receives approval from the user device 134 the server 106 may move to step 308 and set up communication with the third party.

Figure 4:
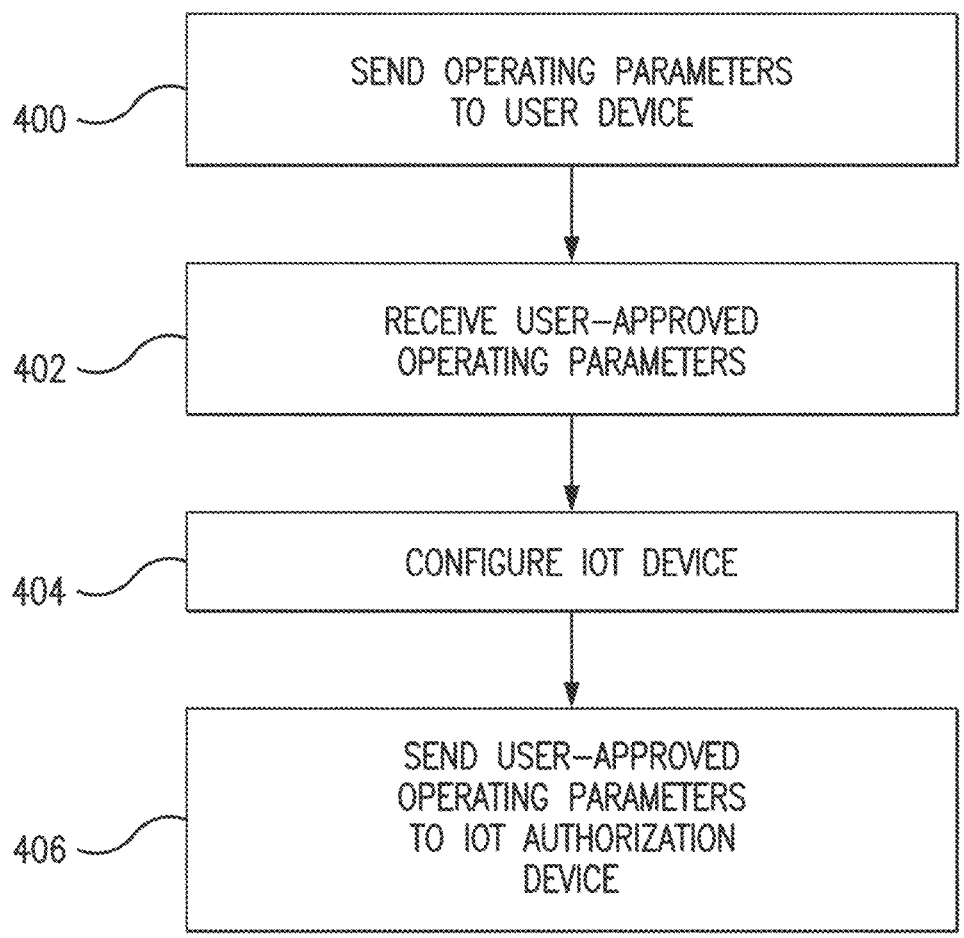
FIG. 4 is a flow chart of a method of operating an IoT relay device according to an embodiment of the present disclosure.

FIG. 4 shows the method of operating a relay device according to an embodiment of the present disclosure.

In step 400 the processor 132 within the relay device 130 is arranged to send operating parameters 124 to the user device 134 for approval. It is noted that the IoT relay device 130 may initially receive the operating parameters 124 that are to be sent to the user device 134 from the IoT device 102. In an alternative configuration however the IoT relay device 130 may, for example, download the operating parameters 124 from an original equipment manufacturer that made the IoT device 102 and/or may generate the operating parameters 124 itself based on the technical details of the IoT device 102 (which may be supplied to the IoT relay device 130 when the IoT device is first associated with the IoT relay device 130).

In step 402 the IoT relay device 130 receives the user-approved operating parameters from the user device 134. In step 402 it is noted that the IoT relay device may be configured to store the user-approved operating parameters such that it can perform the method according to FIG. 3.

In step 404 the IoT relay device 130 is arranged to configure the IoT device to perform the autonomous task according to the user approved parameters. This may comprise forwarding the user-approved operating parameters 126 to the IoT device 102 or may comprise sending a configuration signal to configure the IoT device 102.

In the event that the IoT relay device 130 is not talking the role of the IoT authorisation device then in step 406 the IoT relay device sends the user-approved operating parameters, along with the IoT device identifier 128 to the IoT server 106 for storage in the profile 120.

Although not shown in FIG. 1 it is noted that each device (IoT device 102, IoT relay device 130 and IoT server 106) comprise a communications interface for sending and receiving the various requests, command signals, notification signals and operating parameters mentioned above.

In further variations of the above embodiments of the disclosure details of the autonomous tasks initiated by the IoT device with third parties may be sent to the issuer 108 for data enrichment of transactions. For example, details of transactions on a transaction summary (credit card statement) may be enhanced with details of the IoT device 102 that initiated the transaction.

The user-approved operating parameters 126 discussed above may additionally restrict the IoT device 102 to certain time windows for carrying out transactions with third party systems and may also specify different operating parameters for different categories of goods (e.g. an IoT fridge may have a lower limit for fresh goods compared to frozen goods). The operating parameters 124 suggested by the IoT device 102 may also be restricted (by the original equipment manufacturer, OEM) to specific third parties for consumables. In some examples the OEM may retail the IoT device 102 at a lower price point if a user accepts that the device 102 will be locked to a specific merchant or merchants.

What is claimed is:

1. A system for operating an Internet of Things (IoT) device, the IoT device capable of performing an autonomous task subject to authorization, the system comprising:
an IoT server including a processor and a memory coupled to the processor, the memory including executable instructions, which when executed by the processor, causes the processor to perform the steps of:
requesting environmental data relating to an environment in which an IoT device is to be operated;
receiving the environmental data;
determining operating parameters relating to an autonomous task to send to a user for approval based on the received environmental data;
sending the operating parameters relating to the autonomous task to the user for approval;
receiving user-approved operating parameters for the autonomous task;
configuring the IoT device to perform the autonomous task within the user-approved operating parameters;
registering the user-approved operating parameters for the IoT device;
in response to a request for the autonomous task with a third-party system from the IoT device:
checking that the request for the autonomous task with the third-party system conforms with the user-approved operating parameters;
based on the request for the autonomous task conforming with the user-approved operating parameters, establishing a communication path between the IoT device and the third-party system; and
based on the request for the autonomous task not conforming with the user-approved operating parameters, shutting down the IoT device.

2. The system as claimed in claim 1, wherein the IoT device is associated with a digital wallet containing a tokenized payment card and the autonomous task comprises performing a transaction with the third-party system using the tokenized payment card.

3. The system as claimed in claim 1, wherein the step of the sending the operating parameters includes sending, a plurality of operating parameters to the user for approval; and
wherein the step of receiving the user-approved operating parameters includes receiving a user selection of one or some of the plurality of operating parameters.

4. The system as claimed in claim 1, wherein the step of configuring the IoT device to perform the autonomous task includes restricting the IoT device to communicating with the third-party system according to the user-approved operating parameters.

5. The system as claimed in claim 1, wherein the step of configuring the IoT device to perform the autonomous task includes restricting the IoT device to carry out specified autonomous tasks according to the user-approved operating parameters.

6. The system as claimed in claim 1, wherein the processor, when executing the executable instructions, further causes the processor to perform the steps of: sending a request for usage data to the user; and determining the operating parameters to send to the user for approval based on the usage data received from the user.

7. The system as claimed in claim 1, further comprising the IoT device including a second processor and a second memory, which includes second executable instructions, which when executed by the second processor, cause the IoT device to perform the step of initiating the autonomous task with the third-party system, by sending a communication to the third-party system, via the communication path established by the IoT server.

8. The system as claimed in claim 7, wherein the second executable instructions, when executed by the second processor, cause the IoT device to perform the step of sending to the IoT server, the request for the autonomous task with the third-party system, the request including an IoT device identifier and a request for authorization to carry out the autonomous task.

9. The system as claimed in claim 1, wherein the step of shutting down the IoT device includes sending a command signal to the IoT device; and
  wherein the system further comprises the IoT device including a second processor and a second memory, which includes second executable instructions, which when executed by the second processor, cause the IoT device to perform the step of shutting down the IoT device in response to the command signal from the IoT server.

\* \* \* \* \*